United States Patent [19]

Coopes et al.

[11] Patent Number: 5,719,380
[45] Date of Patent: Feb. 17, 1998

[54] MICROWAVE HEATING APPARATUS FOR HEATING A FLOWING FLUID

[75] Inventors: Ian Henry Coopes, Chamberwell; David William Elder, Regent; George Jiri Musil, Grisborne, all of Australia

[73] Assignee: Eastman Kodak Company, Rochester, N.Y.

[21] Appl. No.: 697,803

[22] Filed: Aug. 30, 1996

[30] Foreign Application Priority Data

Sep. 22, 1995 [AU] Australia ............... PN5595

[51] Int. Cl.⁶ .................. H05B 6/78; H05B 6/68
[52] U.S. Cl. ............... 219/687; 219/693; 219/710
[58] Field of Search ................. 219/687, 688, 219/693, 710, 738

[56] References Cited

U.S. PATENT DOCUMENTS

| | | | |
|---|---|---|---|
| Re. 33,791 | 1/1992 | Carr | 374/122 |
| 4,085,613 | 4/1978 | Richard | 73/193 R |
| 4,358,652 | 11/1982 | Kaarup | 219/688 |
| 4,417,116 | 11/1983 | Black | 219/688 |
| 4,490,287 | 12/1984 | Hardwick et al. | 219/687 |
| 4,614,514 | 9/1986 | Carr et al. | 604/113 |
| 4,673,782 | 6/1987 | Koepke et al. | 219/10.55 M |
| 4,715,727 | 12/1987 | Carr | 374/122 |
| 4,778,969 | 10/1988 | Le Viet | 219/687 |
| 4,968,151 | 11/1990 | Thomson | 374/135 |
| 5,122,633 | 6/1992 | Moshammer et al. | 219/687 |
| 5,180,896 | 1/1993 | Gibby et al. | 219/10.55 A |
| 5,247,148 | 9/1993 | Mencher | 219/688 |
| 5,336,869 | 8/1994 | Kumar | 219/687 |

FOREIGN PATENT DOCUMENTS

WO 93/04397  3/1993  WIPO.

*Primary Examiner*—Philip H. Leung
*Attorney, Agent, or Firm*—Mark G. Bocchetti

[57] ABSTRACT

An apparatus for heating a flowing fluid with microwave energy comprising a conduit having an inlet portion, an outlet portion, and a retention portion wherein at least the retention portion of the conduit is fabricated from a material which is substantially microwave transparent. A temperature probe is provided for measuring the temperature of the flowing fluid in the outlet portion. The cross-sectional area of the retention portion is substantially greater than the cross-sectional area of the outlet portion such that the flow rate through the retention portion is slower than the flow rate through the outlet portion from the retention portion to the temperature probe. Microwave energy is used to heat the flowing fluid in the retention portion, the microwave energy being generated by a source which is controlled in response to a signal from the temperature probe. The retention portion of the conduit resides within a wave guide and passes transversely therethrough. The wave guide is dimensioned to allow a standing electromagnetic wave to be set up therein with the retention portion residing at a region of maximum field strength.

10 Claims, 5 Drawing Sheets

MICROWAVE HEATING APPARATUS FOR HEATING A FLOWING FLUID

FIELD OF THE INVENTION

The present invention relates to the heating of flowing fluids and fluid materials by application of microwave energy. The invention is particularly suitable for heating mixtures in the manufacture of photographic dispersions and it will be described in relation to this context, but it is to be understood that the invention is not limited to this application. Generally, the invention may be used for the heating of a liquid or slurry that includes as a component or is composed of a dielectric substance that absorbs microwave energy to thereby heat the liquid or slurry. The invention is particularly useful for heating lossy dielectric liquids or slurries that have a high viscosity.

BACKGROUND OF THE INVENTION

Australian Patent No. 653050 discloses a process for manufacturing a photographic coupler dispersion in which a coupler/solvent mixture is continuously fed through a microwave heating station to cause dissolution of the coupler. The application of microwave energy achieves relatively rapid heating of the mixture compared with conventional convection or conduction heating. This rapid heating has the benefit of rapidly dissolving the coupler into a coupler solution to thereby minimize the likelihood of thermal degradation of the coupler. AU 653050 discloses microwave heating stations wherein the coupler/solvent mixture is subjected to microwave energy for periods of between about 1 to 2 minutes.

In experiments to optimize a heating unit design and to achieve even shorter heating times the applicant experienced considerable difficulty in achieving minimal thermal degradation of the coupler along with satisfactory temperature control. For example, for a heating unit comprising a simple straight tube passing through a waveguide, it was found that with very short heating times (i.e. of the order of 7 seconds for a 50 g/rain flow rate) the level of degradation of the coupler began to increase with diminishing heating time, which is the opposite of the expected pattern. This increasing degradation is thought to be the result of uneven flow distribution of the coupler/solvent slurry across the width of the tube, the material closer to the wall moving more slowly than at the centre. Since an increase in energy flux is required to heat the faster moving central portion of the slurry, the slower moving material near the tube wall may experience substantially higher temperatures thus leading to an increase in the level of thermal degradation of the coupler.

SUMMARY OF THE INVENTION

An object of the present invention is to provide apparatus for rapidly heating a flowing fluid material such that thermal degradation of the material is minimized. Another object is to provide an apparatus that allows optimal temperature control for the rapid heating of a flowing fluid material.

According to the invention, there is provided apparatus for heating a flowing fluid material including, a chamber for receiving a microwave energy input for establishing an electric field therein, a conduit means passing through the chamber, the conduit means including a fluid flow passage and being made of a material such that a lossy dielectric fluid material flowing therethrough is substantially directly heated by a microwave electric field in the chamber, the conduit means being adapted for association with a temperature measurement means for measuring the temperature of a heated fluid material soon after exit of the fluid material from the chamber, wherein the fluid flow passage of the conduit means has a cross sectional area within the chamber such that the heating time for a flowing fluid material is substantially longer than the time delay to measurement of the temperature of that fluid material by a said temperature measurement means.

Preferably the fluid flow passage of the conduit means is of increased cross sectional area within the chamber relative to its cross sectional area from its exit to a temperature measurement means.

Preferably, the heating time for a flowing fluid material is at least ten times the time delay to measurement of the temperature of the fluid material. Such a heating time is given by the following relationship:

$$P_2 \cdot H \cdot A_2 \geq 10 \cdot P_1 \cdot L \cdot A_1$$

where $P_2$=average density of the flowing fluid material within the chamber $P_1$=average density of the fully heated fluid material $H$=length of conduit within the chamber $L$=length of conduit from the chamber to the temperature measuring means $A_1$=cross sectional area of the fluid flow passage from the chamber to the temperature measurement means $A_2$=cross sectional area of the fluid flow passage within the chamber.

The chamber for receiving a microwave energy input may be any suitable microwave cavity and preferably the conduit means is positioned therein such that a lossy dielectric fluid material flowing through the cavity via the conduit means is substantially maximally heated by an electric field within the cavity. Such maximal heating will occur when the conduit means within the cavity coincides with a region of maximum electric field strength. Preferably the chamber is a suitable dimensioned waveguide structure which allows a standing wave to be set up such that a conduit means in the form of a straight section can be positioned to pass transversely through the wave guide at the region of maximum electric field strength.

In order to meet the condition that a fluid material flowing through the conduit means be substantially directly heated by a microwave electric field, the material of which the conduit means is composed (at least within the chamber) needs to be "microwave transparent", that is, it must be a low loss dielectric material such that substantially no energy dissipation occurs therein. This will leave substantially all of the energy flux that impinges on the conduit means available for heating a fluid material that is flowing through the conduit means. Example materials for the conduit means are plytetrafluoroethylene (PTFE) and borosilicate glass.

An embodiment of the invention will now be described, by way of example only, with reference to the accompanying drawings. The specific form and arrangement of the features of the invention shown in the drawings is not to be understood as limiting on the invention, the scope of which is to be determined according to the generality of the preceding description.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE PREFERRED EMBODIMENTS

Figure 1:
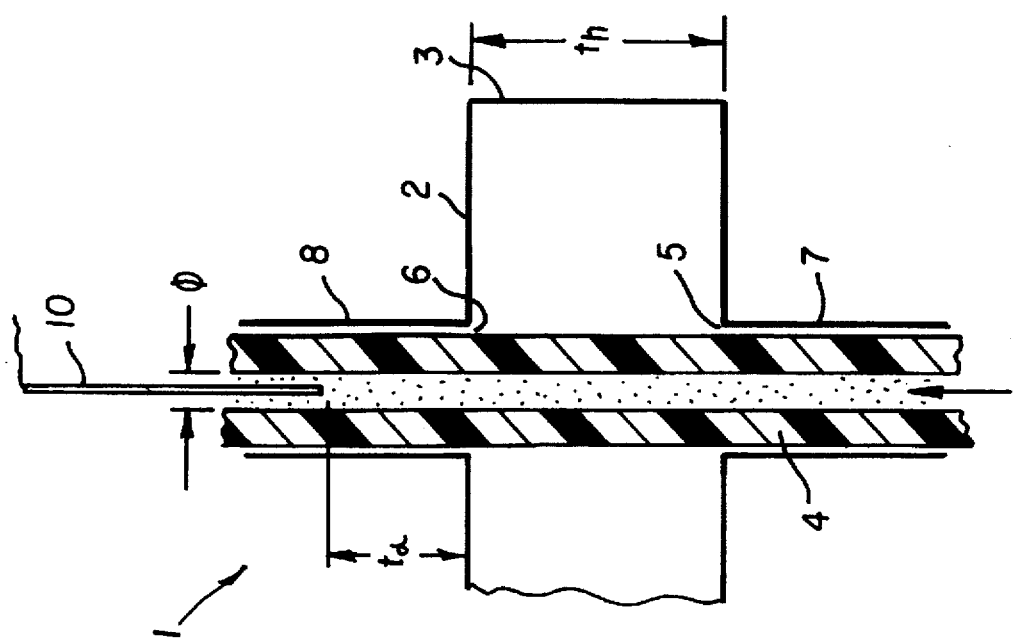
FIG. 1 is a schematic diagram of an originally developed laboratory scale microwave heating apparatus, which is provided for comparison with a laboratory scale embodiment of the invention as shown in FIG. 2.

The heating apparatus 1 shown in FIG. 1 includes a chamber, for receiving a microwave energy input, in the form of a section of rectangular waveguide 2, the dimensions of which are such as to propagate an input of microwave energy (not shown) in the $TE_{10}$ field mode. The waveguide section 2 is terminated by a short circuiting metal plate 3, which sets up a standing electromagnetic wave inside the waveguide.

A conduit means in the form of a straight length of tube 4 passes transversely through the waveguide section 2. Tube 4 is composed of a microwave transparent material such as the PTFE "Teflon", or another similar material. Ports 5 and 6, which are surrounded by cylindrical extensions 7 and 8, are provided in opposite walls of the wave guide 2 to allow for entry and exit of the tube 4. The cylindrical extensions 7 and 8 are quarter-wavelength chokes for preventing leakage of the microwave energy from the waveguide 2. The bore 9 of tube 4 provides a constant diameter fluid flow passage through the waveguide, which passage is located at the region of maximum electric field strength.

The conduit means 4 of the FIG. 1 apparatus is adapted for association with temperature measuring means, in the form of RTD probe 10, by virtue of the bore 9 being of sufficient diameter $\phi$ to receive the probe 10.

Figure 2:
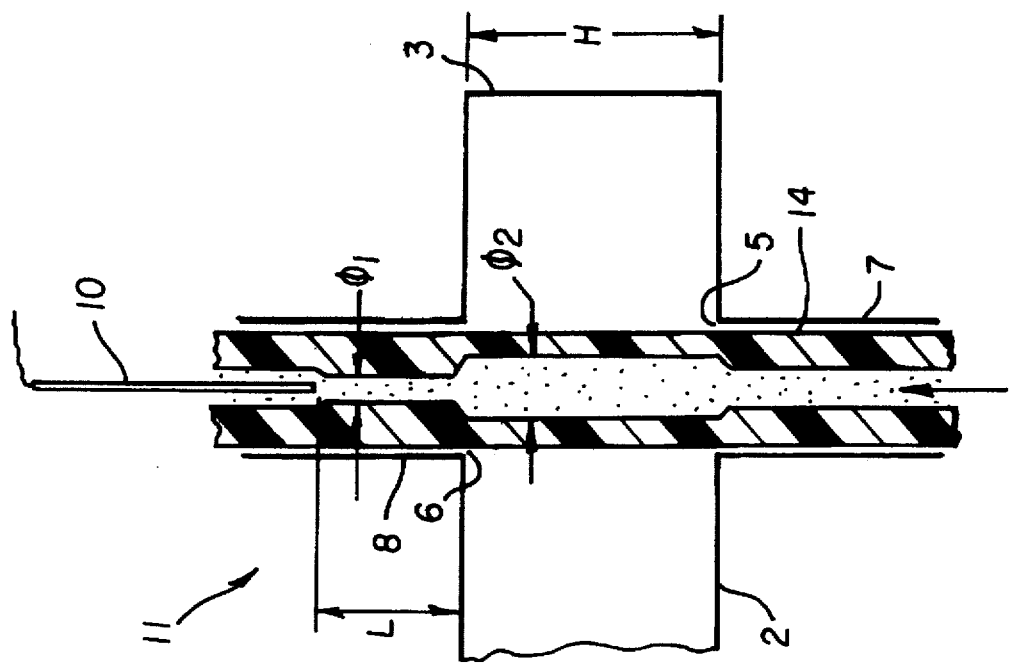
FIG. 2 is a schematic diagram of a laboratory scale embodiment of the invention.

The heating apparatus 1, which is only a laboratory scale embodiment of the invention, is designed for use with relatively small quantities of material, which can be pumped through the heating chamber 2 at flow rates in the range, for example, of 20 to 150 g/min. Microwave power at a frequency of 2450 Mhz is provided by a single 1 kW magnetron. Heating occurs in the straight length of the tube 4 located within the chamber 2, which may be some 45 mm in length. A closed-loop temperature control system (not shown) is employed in the process of heating a continuously moving slurry consisting of a coupler/solvent mixture, which slurry is volumetrically heated from room temperature to the desired solubilization temperature as it passes through the 45 mm long heating zone. The residence time of the slurry inside the heating zone is very short, e.g. at a flow rate of 50 g/min the residence time is about 7 seconds. These very short residence times (relative to time delay to the probe 10) present problems in achieving accurate temperature control. In fact, experiments with the apparatus 1 of FIG. 1 revealed serious difficulties in achieving minimum thermal coupler degradation and satisfactory temperature control with such short residence times in the heating zone. Consequently, an apparatus as shown in FIG. 2 has been developed to alleviate these difficulties.

The heating apparatus 11 shown in FIG. 2 generally corresponds with that shown in FIG. 1 except for the conduit means 4, as will be described below. Features of the FIG. 2 apparatus that are the same as features of the FIG. 1 apparatus have been accorded the same reference numeral. In the FIG. 2 apparatus, there is a conduit means 14 which is different to the conduit means 4 of the FIG. 1 apparatus. Thus the heating apparatus 11 shown in FIG. 2 includes a conduit means 14 in the form of a straight length of PTFE or like material tube the bore of which has a larger diameter $\phi_2$ in the heating zone than in the inlet or exit passages (the exit passage diameter being shown as $\phi_1$ on FIG. 2). The diameters $\phi_1$ and $\phi_2$ are determined by the dimensions of the waveguide 2 and the position of the temperature probe 10 according to relationships to be described below (in FIG. 2 the smaller diameter of the inlet tube is to reduce waste, however it is to be understood that the inlet tube could be of any diameter, for example it could be $\phi_2$).

A probe 10 is positionable within the bore of tube 4 (of FIG. 1) or tube 14 (of FIG. 2) to measure the temperature of a sample heated fluid material soon after exit of the sample from waveguide 2. Probe 10 may be a 3 mm diameter RTD probe which, because of its conductive metal sheath, must be kept away from the microwave field. Probe 10 is therefore located some distance downstream from the heating zone, as shown in FIGS. 1 and 2. This separation of the probe from the heating zone results in a significant delay between the heating of the sample and the measurement of its temperature. It is generally accepted that, for adequate temperature control, the sample heating time ($t_h$) be at least ten times the time delay to measurement ($t_d$), i.e.

$$t_h \geq 10 \cdot t_d \qquad (1)$$

It was found experimentally that for heating apparatus as described above the temperature probe 10 could be safely moved to within 33 mm of the waveguide cavity. However, since the heating zone is about 45 mm long, then for a straight Teflon insert 4 as shown in FIG. 1, the relationship in equation (1) cannot be realized.

The transit time (t) of a sample traveling through conduit means 4 can be calculated from:

$$t = [\pi \cdot (\phi)^2 \cdot l \cdot P]/4 \cdot u \qquad (2)$$

where $\mu$=sample flow rate (kg.sec$^{-1}$)

P=sample density (kg.m$^{-3}$)

$\phi$=internal diameter of the tube l=length of the tube

By altering the internal geometry of the tube to that shown in FIG. 2, the relationship of equation (1) can be expressed, using equation (2), as:

$$P_2 \cdot H \cdot (\phi_2)^2 \geq 10 \cdot P_2 \cdot L \cdot (\phi_1)^2 \qquad (3)$$

where $P_2$ = average density of the sample within the heating zone
$P_1$ = average density of the fully heated sample
H = length of heating zone
L = length from the microwave cavity to the temperature probe For the geometry of the heating apparatus of FIGS. 1 and 2 the relationship given by equation (3) is just satisfied if $\phi_2$=12.6 mm and $\phi_1$=5 mm. Smaller values of $\phi_1$ may lead to excessive pressures within the tube 14 for very viscous slurries, and may increase the chance of a blockage. Higher values of $\phi_2$ may make tuning of the waveguide cavity difficult, and may also lead to excessive thermal gradients within the sample. Thus the above given internal diameters appear to be optimal for the laboratory scale apparatus as shown in FIG. 2, but it will be appreciated that an industrial scale apparatus according to the invention will have different values for $\phi_1$ and $\phi_2$, which can be determined from equation (3) and appropriately scaling the ratio of $\phi_2$ to $\phi_1$.

Comparative experiments (given below) with the new (FIG. 2) and the normal (FIG. 1) applicator designs showed a markedly lower level of thermal degradation with the new design at most flow rates. (The terms "applicator" or "unit" are alternative expressions for the apparatus shown in FIG. 1 or FIG. 2). Increasing the diameter $\phi_2$ of the tube 14 in the new (FIG. 2) apparatus design over the length of the heating zone results in longer residence times and lower energy fluxes, at a given flow rate.

EXAMPLE 1

Figure 3:
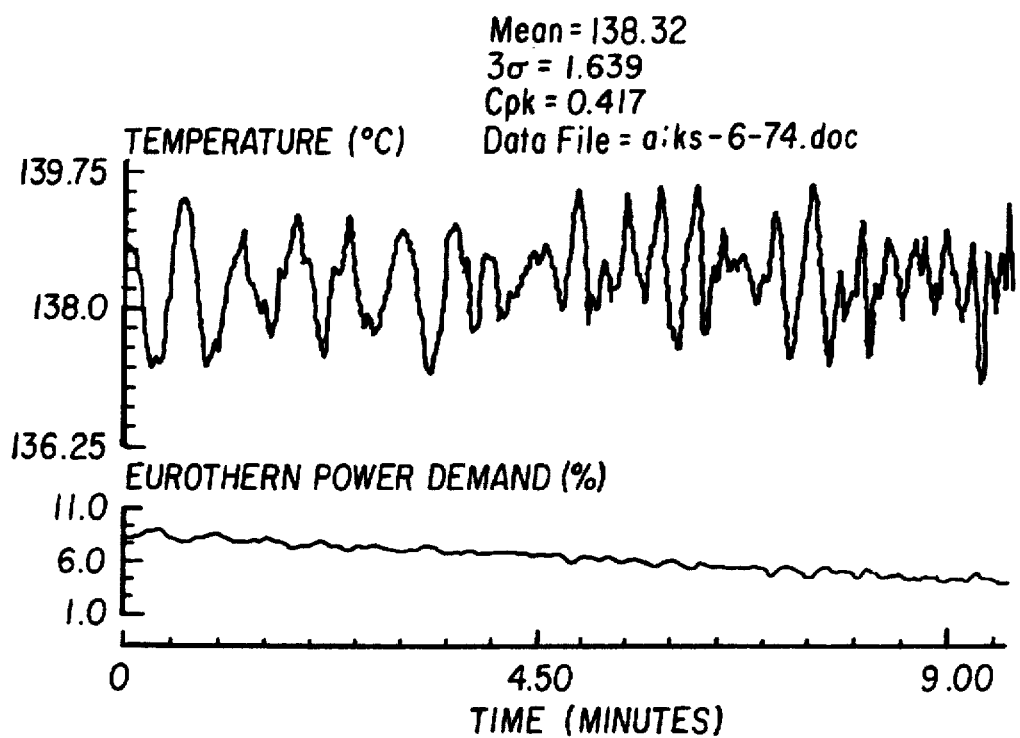
FIGS. 3 and 4 are temperature profile graphs for the heating of dibutyl phthalate in apparatus as shown in, respectively, FIG. 1 and FIG. 2.
Figure 4:
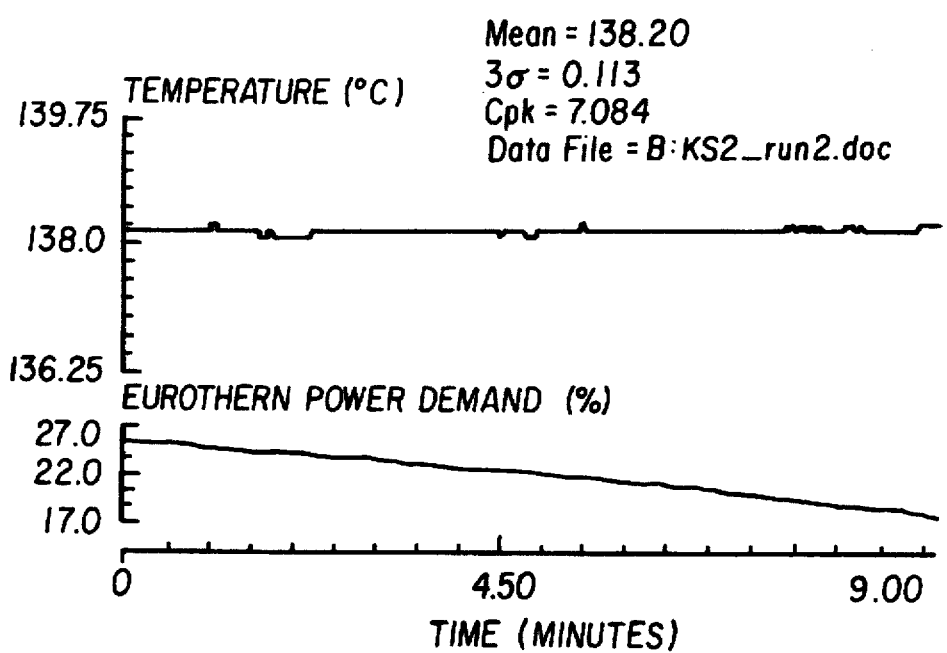

The solvent dibutyl phthalate was pumped through the new (FIG. 2) and normal (FIG. 1) applicators at a flow rate of 50 g/min and heated by microwave radiation to 138° C. The variability of the temperature control was determined by running the units for 10 minutes. The temperature profiles shown in FIGS. 3 and 4 indicate a much better variability with the new applicator design. The level of variability is expressed as 3 sigma (three times standard deviation).

EXAMPLE 2

Figure 5:
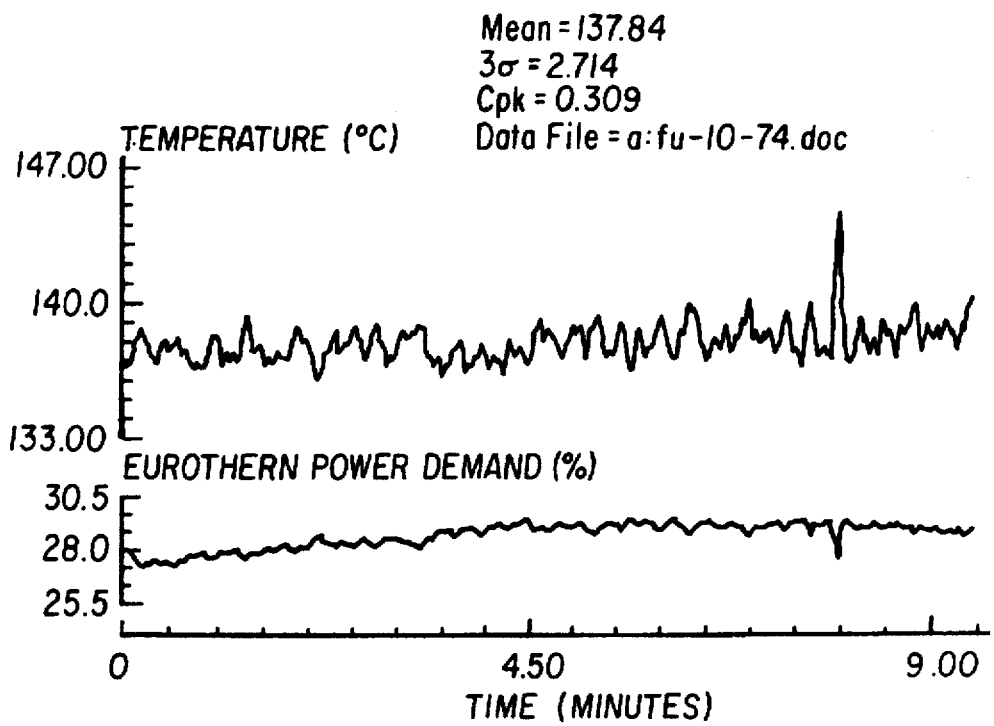
FIGS. 5 and 6 are temperature profile graphs for the heating of a photographic coupler/solvent mixture in apparatus as shown in, respectively, FIG. 1 and FIG. 2.
Figure 6:
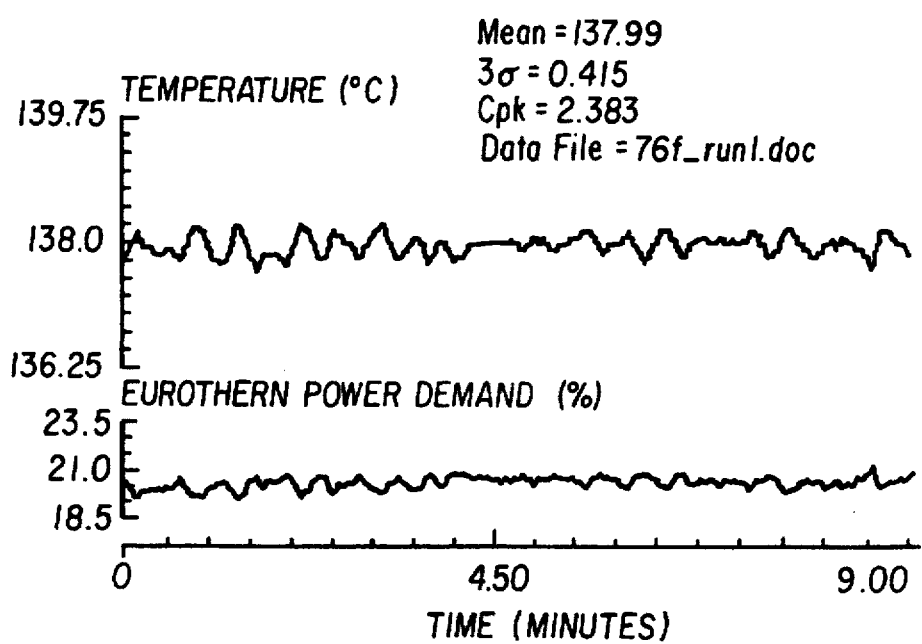

2 kg of a photographic coupler (dye-forming material) was thoroughly mixed with an equal quantity of dibutyl phthalate to form a uniform slurry at room temperature (about 20° C.). The slurry was poured into the hopper of a Seepex progressive cavity pump, and then pumped through the microwave applicator at various flow rates. Microwave power was then applied to heat the mixture to the aim temperature of 138° C. These experiments were performed with both the new (FIG. 2) and normal (FIG. 1) applicator designs. The variability of the temperature control was assessed by running the units at a flow-rate of about 50 g/min for 10 minutes. The temperature profiles are shown in FIGS. 5 and 6. It can be seen that the variability of the heating process is again much better with the new applicator.

Figure 7:
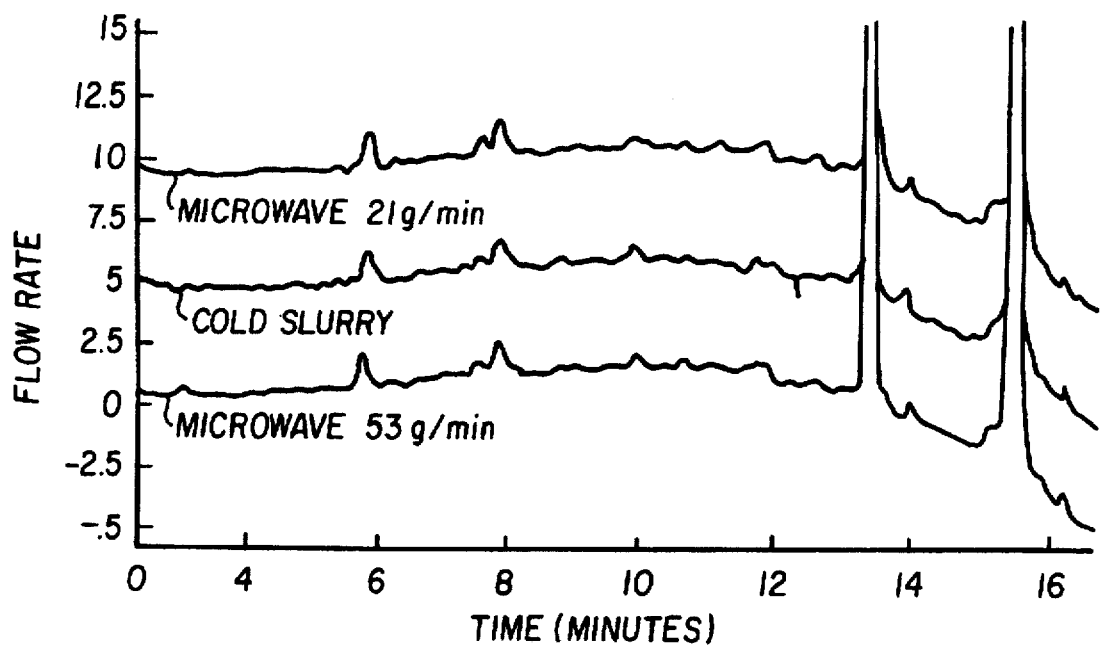
FIGS. 7 and 8 show liquid chromatography data for assessing the level of thermal degradation of the coupler in coupler/solvent mixtures heated in apparatus as shown in, respectively, FIG. 1 and FIG. 2.
Figure 8:
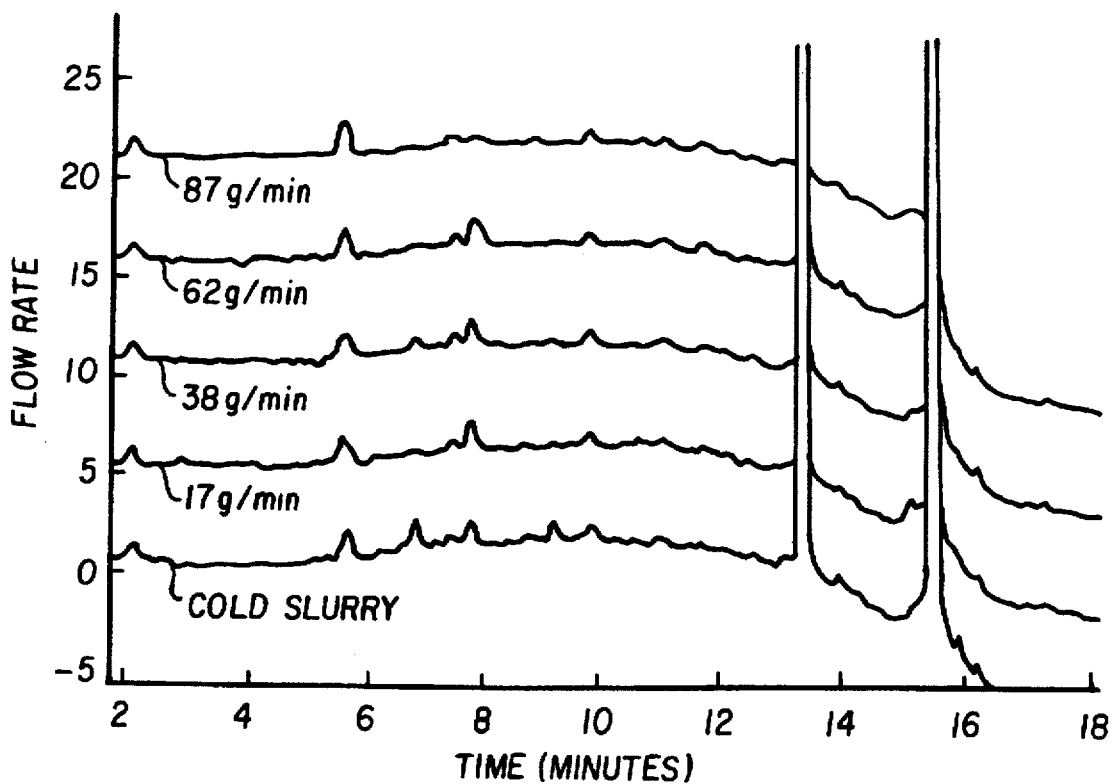

The level of thermal degradation was assessed by means of liquid chromatography and spectrophotometry. With liquid chromatography, the degradation product of the coupler is indicated by a peak at a retention time of about 3 minutes. The results for samples heated in the normal applicator, with flow rates between 21 and 53 g/min, are presented in FIG. 7. The 53 g/min sample showed the largest degradation peak. In contrast, the samples heated with the new applicator at flow rates from 17 to 87 g/min, showed virtually no degradation except at the lowest flow-rate of 17 g/min (FIG. 8).

Figure 9:
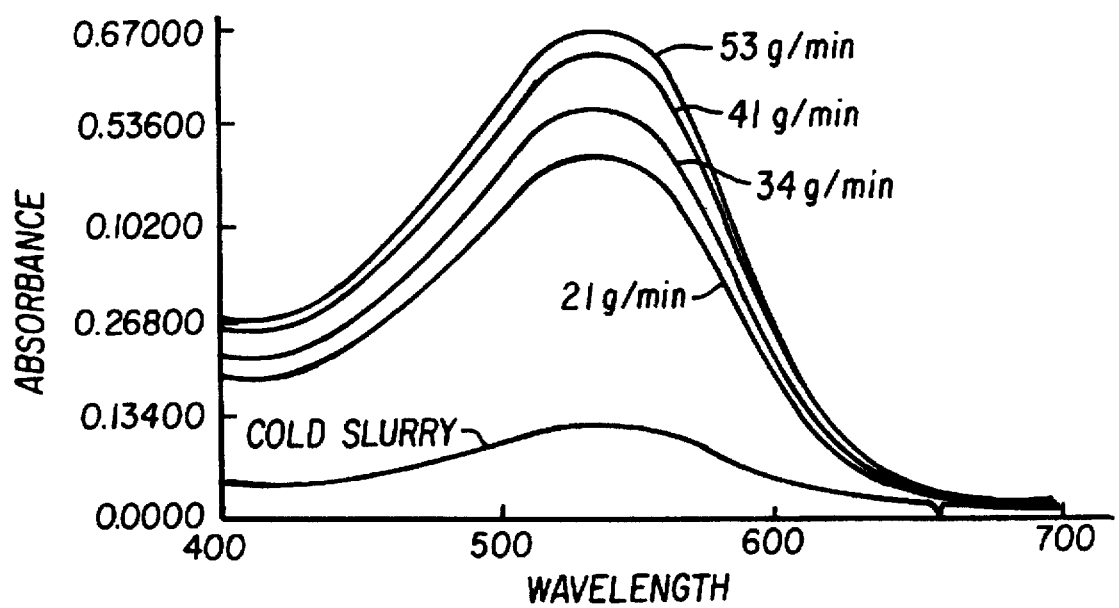
FIGS. 9 and 10 shown spectrophotometric data for assessing the level of thermal degradation of the coupler in coupler/solvent mixtures heated in apparatus as shown in, respectively, FIG. 1 and FIG. 2.
Figure 10:
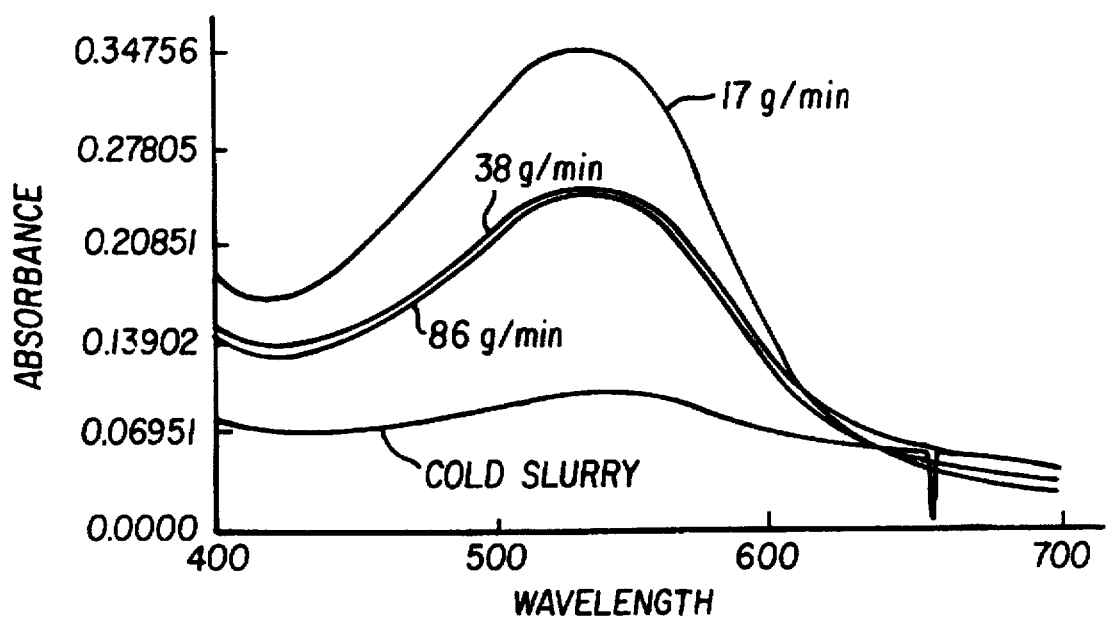

The visible spectra of the heated mixture exhibited a large absorption peak with grew with increasing thermal degradation. The spectra of samples heated in the new applicator (see FIG. 10) showed much lower absorption peaks than those of samples heated in the normal applicator (see FIG. 9).

The invention described herein is susceptible to variations, modifications and/or additions other than those specifically described and it is to be understood that the invention includes all such variations, modifications and/or additions which fall within the spirit and scope of the above description.

We claim:

1. An apparatus for heating a flowing fluid with microwave energy comprising:

(a) a conduit means including an inlet portion, a retention portion, and an outlet portion, at least said retention portion of said conduit means being fabricated from a material which is substantially microwave transparent said retention portion forming a single, undivided chamber, said retention portion having an inside diameter ($\phi_2$) and a length (H), and said outlet portion having an inside diameter ($\phi_1$) and a length (L) such that there is a relationship between said retention portion and outlet portion can be described as $$P_2H(\phi_2)^2 > 10P_1L(\phi_1)^2$$

where $P_1$ is the average density of the fluid within said outlet portion and $P_2$ is the average density of the fluid within said retention portion;

(b) a temperature probe for measuring the temperature of the flowing fluid in said outlet portion, said flowing fluid residing in said retention portion for a period which is substantially longer than the time required for the flowing fluid exiting said retention portion to reach said temperature probe;

(c) means for heating the flowing fluid within said retention portion with microwave energy;

(d) a control system for controlling said means for heating in response to a signal from said temperature probe.

2. An apparatus as recited in claim 1 wherein:

said period is at least ten times longer than the time required for the flowing fluid exiting said retention portion to reach said temperature probe.

3. An apparatus as recited in claim 1 wherein:

said means for heating includes a waveguide, said conduit means passing transversely through said waveguide such that said retention portion of said conduit means resides within said waveguide.

4. An apparatus as recited in claim 3 wherein:

said waveguide is dimensioned to allow a standing electromagnetic wave to be set up therein.

5. An apparatus as recited in claim 4 further comprising:

a cylindrical extension protruding from each side of said waveguide, said conduit means passing through said cylindrical extensions, said cylindrical extensions serving as quarter-wavelength chokes for preventing leakage of microwave energy from said waveguide.

6. An apparatus as recited in claim 3 wherein:

said conduit means passes through said waveguide such that said retention portion resides at a region of maximum field strength.

7. An apparatus as recited in claim 1 wherein:

said material is polytetrafluoroethylene.

8. An apparatus as recited in claim 1 wherein:

said material is borosilicate glass.

9. An apparatus as recited in claim 1 wherein:
said retention portion has a first inside diameter, and said outlet portion has a second inside diameter, said first inside diameter being larger than said second inside diameter.

10. An apparatus as recited in claim 1 wherein:
said outlet portion extends from said retention portion to said temperature probe.

* * * * *